US012637053B2

(12) United States Patent　　(10) Patent No.: US 12,637,053 B2
Tione et al.　　(45) Date of Patent: May 26, 2026

(54) METHOD AND SYSTEM FOR VERIFYING THE OPERATION OF BRAKING MEANS OF AT LEAST ONE VEHICLE, AND SYSTEM FOR MEASURING THE FRICTION FORCE

(71) Applicant: FAIVELEY TRANSPORT ITALIA S.P.A., Turin (IT)

(72) Inventors: Roberto Tione, Turin (IT); Matteo Frea, Turin (IT); Angelo Grasso, Asti (IT)

(73) Assignee: FAIVELEY TRANSPORT ITALIA S.P.A., Turin (IT)

( * ) Notice: Subject to any disclaimer, the term of this patent is extended or adjusted under 35 U.S.C. 154(b) by 209 days.

(21) Appl. No.: 18/257,785

(22) PCT Filed: Dec. 22, 2021

(86) PCT No.: PCT/IB2021/062191
§ 371 (c)(1),
(2) Date: Jun. 15, 2023

(87) PCT Pub. No.: WO2022/137165
PCT Pub. Date: Jun. 30, 2022

(65) Prior Publication Data
US 2024/0109529 A1　Apr. 4, 2024

(30) Foreign Application Priority Data
Dec. 22, 2020　(IT) ........................ 102020000031898

(51) Int. Cl.
*B60T 17/22* (2006.01)
*B60T 13/74* (2006.01)
*B60T 17/04* (2006.01)

(52) U.S. Cl.
CPC ............ *B60T 17/228* (2013.01); *B60T 13/74* (2013.01); *B60T 17/04* (2013.01)

(58) Field of Classification Search
CPC ........ B60T 17/228; B60T 13/74; B60T 17/04; B60T 2270/88; B60Y 2200/30; B60Y 2306/15
(Continued)

(56) References Cited

U.S. PATENT DOCUMENTS

2014/0222258 A1* 8/2014 Elstorpff ............... B60T 17/228
701/19
2020/0079343 A1 3/2020 Martin

FOREIGN PATENT DOCUMENTS

EP　　2030855 A2　3/2009

OTHER PUBLICATIONS

ISA European Patent Office, International Search Report Issued in Application No. PCT/IB2021/062191, Apr. 22, 2022, WIPO, 2 pages.

* cited by examiner

*Primary Examiner* — Lindsay M Low
*Assistant Examiner* — Omar Morales
(74) *Attorney, Agent, or Firm* — K&L Gates LLP

(57) ABSTRACT

A method for verifying the operation of braking means of at least one vehicle, in particular a railway vehicle, is described, comprising the steps of:
　a) imposing a braking force on at least one wheel of the at least one axle of the at least one vehicle;
　b) towing the at least one vehicle according to a non-zero and constant forward speed;
　c) measuring on a rail at least one friction force which is a function of a braking force;
　d) comparing the at least one measured friction force with a predetermined minimum force value;
　e) determining that the braking means associated with the at least one wheel whose friction force is lower than the predetermined minimum force value are malfunction- (Continued)

ing. Also described are a system for measuring a friction force and a system for verifying the operation of braking means of at least one vehicle.

20 Claims, 5 Drawing Sheets

(58) Field of Classification Search
USPC .......................................................... 701/70
See application file for complete search history.

METHOD AND SYSTEM FOR VERIFYING THE OPERATION OF BRAKING MEANS OF AT LEAST ONE VEHICLE, AND SYSTEM FOR MEASURING THE FRICTION FORCE

CROSS REFERENCE TO RELATED APPLICATIONS

The present application is a U.S. National Phase of International Application No. PCT/IB2021/062191 entitled "METHOD AND SYSTEM FOR VERIFYING THE OPERATION OF BRAKING MEANS OF AT LEAST ONE VEHICLE, AND SYSTEM FOR MEASURING THE FRICTION FORCE," and filed on Dec. 22, 2021. International Application No. PCT/IB2021/062191 claims priority to Italian Patent Application No. 102020000031898 filed on Dec. 22, 2020. The entire contents of each of the above-listed applications are hereby incorporated by reference for all purposes.

TECHNICAL FIELD

The present invention generally relates to the field of braking systems. In particular, the invention relates to a method for verifying the operation of braking means of at least one vehicle, in particular at least one railway vehicle, and to a system for verifying the operation of braking means of at least one vehicle, in particular at least one railway vehicle, and a system for measuring a frictional force. The verification of the operation, i.e. the diagnosis, may also be carried out in real time.

PRIOR ART

The prior art will be described below with particular reference to the field of railway vehicles. The above may be applied similarly, where possible, also to vehicles of other fields traveling by rail.

After the activation of a railway vehicle or a railway convoy including several railway vehicles, before its entry into service, for example daily operation, an action known to those skilled in the art as a "brake test" is carried out. This action is necessary to verify the correct operation of a braking system, as a whole of the railway vehicle or a railway convoy.

The "brake test" is performed with different methods depending on the composition of the type of one or more railway vehicles and the composition of the railway convoy.

In the case of latest generation railway convoys, known as fixed composition, the brake test is generally automated. For example, by means of pressure sensors connected to braking cylinders of a braking system, the braking control means (e.g. computer) check that the pneumatic braking pressures controlled by them are actually present at said braking cylinders, within predetermined tolerance bands.

However, this type of automatic check is not able to verify that the braking cylinder of the braking system applies the braking force, corresponding to the braking pressure, to a pad-disc or shoe-wheel clutch pair. Malfunctions of the braking cylinder may for example vary the nominal pressure/force ratio by locally reducing the braking force.

In the case of freight convoys, made for example by a locomotive and a plurality of railway vehicles, there is no information means of communication between said locomotive and the connected railway vehicles. In this case, the "brake test" includes a procedure which involves an operator, who is asked to check, at least visually, that in the absence of pneumatic braking pressure the shoe 103 is detached from the wheel, or that the pad is detached from the disc. The operator should also check that in the presence of pneumatic braking pressure, the shoe is in contact with the wheel, or the pad is in contact with the disc.

This procedure requires an extremely long time, as for the visual verification the operator is forced to walk along the railway vehicle or railway convoy on each side, in all its length. This procedure is carried out in the case of applied braking and then repeated in the case of released braking. Furthermore, the visual analysis does not ensure that, when visually the braking is applied, the pressure actually applied to the braking cylinders corresponds to the nominal one, concealing hidden faults to one or more pneumatic components in the braking force generation chain.

The problem relating to the "brake test" was previously described with reference to pneumatic braking systems. However, the same problem may be found likewise in electro-pneumatic or electromechanical braking systems and in the related braking application means.

Recent technological developments propose to provide each railway vehicle with a self-powered data acquisition system through "energy harvesting" systems, connected to appropriate pressure and force sensors, provided with wireless communication means, and capable of transmitting to the ground data related to the brake test during the "brake test" step.

As much as the proposed system works, it implies a high cost both in terms of hardware components and in terms of installation and upgrade costs for the complete fleet.

Furthermore, since the "brake test" is a procedure inherent to safety in operation, it may imply onerous costs of development and certification in accordance with the safety standards in force (EN50126, EN50128, EN50129) as regards the data acquisition and especially transmission system.

In the field of vehicles with rubber wheels, equipment is available for periodically checking a braking system, where the vehicle under test is first positioned on rollers which impart rotation to the wheels and, subsequently, the brakes of the vehicle under test are activated. Finally, the braking torque imparted to the rollers is measured. Based on this measurement, the efficiency of the braking system is evaluated. Obviously, this approach may not be applied in the case of rail vehicles, e.g. a railway vehicle or a railway convoy, at the beginning of each daily mission, due to the complexity of application on each axle of each vehicle making up the convoy and due to the time required to perform it.

SUMMARY OF THE INVENTION

An object of the present invention is therefore to provide an effective solution which does not involve high costs as regards both the hardware components and the installation and upgrade costs of a possible complete fleet.

A further object is to provide a solution which does not involve expensive development and certification costs in accordance with the safety standards in force at the filing date of the present invention (EN50126, EN50128, EN50129).

The aforesaid and other objects and advantages are achieved, according to an aspect of the invention, by a method for verifying the operation of braking means of at least one vehicle having the features defined in claim 1, by a system for measuring the friction force generated by at least one wheel of at least one vehicle having the features defined in claim 9 or 13, and by a system for verifying the operation of braking means of at least one vehicle having the features defined in claim 15. Preferred embodiments of the invention are defined in the dependent claims, the content of which is to be understood as an integral part of the present description.

BRIEF DESCRIPTION OF THE DRAWINGS

The functional and structural features of some preferred embodiments of a method for verifying the operation of braking means of at least one vehicle, of a system for measuring the friction force generated by at least one wheel of at least one vehicle and of a system for verifying the operation of braking means of at least one vehicle according to the invention will now be described. Reference is made to the appended drawings, in which.

DETAILED DESCRIPTION

Figure 1:
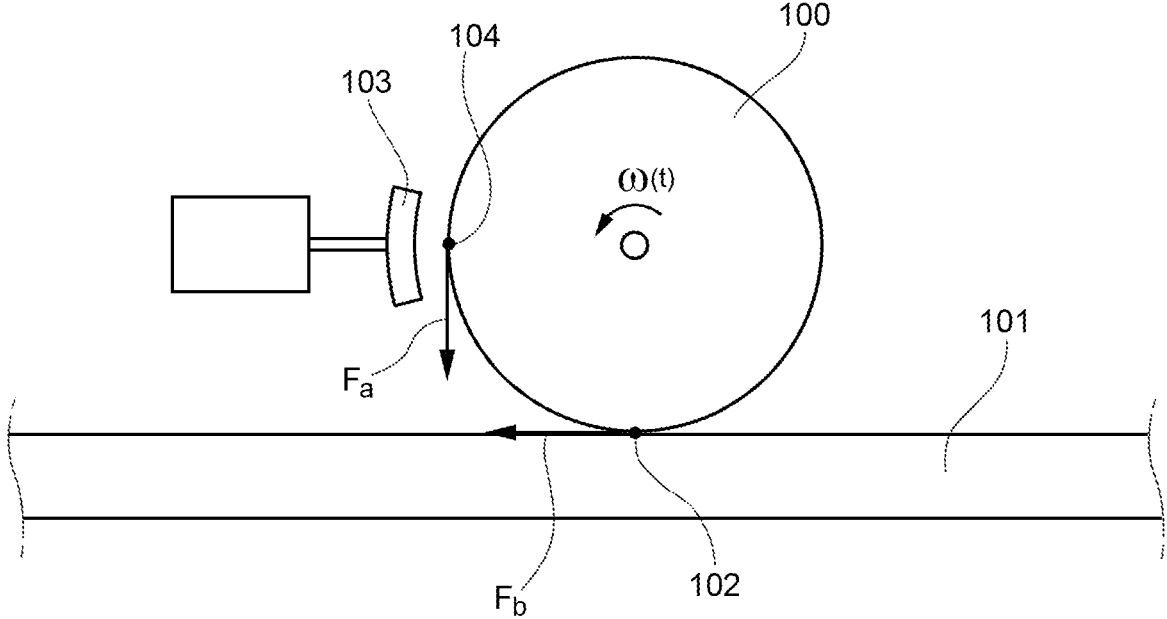
FIG. 1 illustrates by way of example a braking cylinder and a shoe of braking means, which are arranged to act on a wheel in transit in contact on a rail.

Before describing in detail a plurality of embodiments of the invention, it should be clarified that the invention is not limited in its application to the design details and configuration of the components presented in the following description or illustrated in the drawings. The invention is capable of assuming other embodiments and of being implemented or constructed in practice in different ways. It should also be understood that the phraseology and terminology have a descriptive purpose and should not be construed as limiting. The use of "include" and "comprise" and their variations is to be understood as encompassing the elements set out below and their equivalents, as well as additional elements and the equivalents thereof.

Furthermore, throughout the present disclosure and in the claims, the terms and expressions indicating positions and orientations, such as "longitudinal", "transverse", "vertical" or "horizontal", refer to a generic ground 205 longitudinal to the travel direction of the one or more vehicles.

As regards the figures, a side view is used and what is shown and described for a wheel supported by a respective rail may be understood as duplicated and applied to a pair of wheels constrained by an axle, and to two rails constituting a track, wherein each rail is associated with each wheel.

Observing for example FIG. 1, a braking system of the shoe-on-wheel type is illustrated. A person skilled in the art is able to apply the present invention in a similar way also to a braking system of the pad-on-disc type. With reference to this figure, in the following it is explained by way of example in detail how a friction force generated by a wheel is generated and how it may be calculated.

A wheel 100 having angular speed ω(t) rests on a rail 101 at the contact point 102. A shoe may exert an equivalent braking force $F_a$ on the wheel 100 at a point 104.

At the point of contact 102 between the wheel 100 and the rail 101, a friction force $F_b$ will consequently be generated.

The equation of equilibrium of the forces acting on the circumference of the wheel 100 having a radius r and moment of inertia J, except for rolling frictions not significant for the discussion of the present invention, is reported herein [the wheel 100 having angular velocity ω (t)]:

$$Fa - Fb = \frac{d\omega(t)}{dt} \cdot J/r$$

For constant non-zero values of ω(t) we will have:

$$\frac{d\omega(t)}{dt} = 0$$

And therefore, under conditions of constant speed ω(t):

$$Fa = Fb$$

Therefore, being able to measure the friction force $F_b$ in a condition of constant ω(t), the value of the braking force $F_a$ will be obtained directly, irrespective of the physical parameters of the wheel, or of the axle, unless there are forces related to rolling frictions, for example related to bearings, which in any case may be considered negligible for the purpose of the present invention.

In a first aspect, the invention relates to a method for verifying the operation of braking means of at least one vehicle 301, 302, . . . , 303, in particular at least one railway vehicle.

The at least one vehicle includes at least one axle to which at least one wheel arranged to travel on a rail 101, 201, 502 is coupled, and braking means associated with said at least one wheel.

In a first embodiment, the method for verifying the operation of braking means comprises the steps of:

a) imposing, by means of the braking means, a braking force $F_a$ on the at least one wheel 100, 200 of the at least one axle of the at least one vehicle 301, 302, . . . , 303;

b) moving the at least one vehicle 301, 302, . . . , 303, so that the at least one vehicle moves at a non-zero and constant forward speed;

c) measuring on the rail 101, 201, 502 a friction force $F_b$ which is a function of said braking force $F_a$, the at least one friction force $F_b$ being exerted by said at least one wheel 100, 200, 503 at a contact point 102, 202 between said rail and said at least one wheel;

d) comparing the at least one measured friction force $F_b$ with a predetermined minimum friction force value $F_{bmin}$;

e) determining that the braking means associated with the at least one wheel whose measured friction force $F_b$ is lower than said predetermined minimum friction force value $F_{bmin}$ are malfunctioning.

For example, the friction force $F_b$ may be measured by at least one force sensor means 208, 209 or at least one strain gauge sensor means 501.

The order in which steps a) and b) have been previously described is not binding. For example, steps a) and b) may be reversed, as it is sufficient that during the measurement of step c) the following conditions are satisfied, irrespective of the order in which these conditions are obtained:

the at least one vehicle moves according to a non-zero and constant forward speed; and the braking force $F_a$ is imposed on the at least one wheel 100, 200 of the at least one axle of the at least one vehicle.

In a further embodiment, preferably, the braking means may belong to or be associated with a pneumatic or electropneumatic braking system. Therefore, some embodiments applicable for example in the case of pneumatic and/or electro-pneumatic braking systems are reported below.

Preferably, the at least one vehicle may include a brake pipe 220 arranged to provide a braking pressure Pf to the braking means associated with said at least one wheel, and the step a) described above may comprise the step of:

imposing in the brake pipe 220 a braking pressure Pf adapted to make said braking means produce the braking force Fa on the at least one wheel 100, 200 of said at least one axle of the at least one vehicle 301, 302, . . . , 303.

In other words, by directly modifying the value of the braking pressure Pf of the brake pipe, on each wheel to which a braking means is associated, whose braking force generated depends on the braking pressure value Pf provided by the brake pipe, the braking force Fa will be applied.

The pressure in the brake pipe 220 may be imposed, for example, by a pressure control means arranged for adjusting the value of the braking pressure Pf.

Preferably, in a further embodiment, the at least one vehicle may include a braking control means associated with said braking means, and said step a) may comprise:

a) a') by means of said braking control means, actuating said braking means so as to impose the braking force Fa on the at least one wheel 100, 200 of said at least one axle of the at least one vehicle 301, 302, . . . , 303.

In this case, preferably, the at least one vehicle may include a main pipe arranged to provide a predetermined braking pressure to the braking means associated with said at least one wheel, and step a') may comprise:

by means of the braking control means, adjusting the value of the predetermined braking pressure received by said main pipe and to be provided to said braking means for actuating said braking means, so as to impose the braking force Fa on the at least one wheel 100, 200 of said at least one axle of the at least one vehicle 301, 302, . . . , 303.

In other words, for example, the value of the predetermined braking pressure provided by the main pipe may be maintained at a predetermined level, e.g. 8 bar-10 bar, but the braking control means will be able to locally adjust the received braking pressure value, so that the actual braking pressure value provided to the braking means is such as to impose the braking force Fa on at least a wheel 100, 200 of said at least one axle of the at least one vehicle 301, 302, . . . , 303. In this way, the braking force generated on each wheel may be adjusted independently.

Preferably, the braking means may include, for example, a braking cylinder to which a shoe or a pad is coupled, and may be arranged to act on a wheel or on a disc, respectively. The braking means may further include a "distributor" valve, an auxiliary tank, a pneumatic weighing device 223, a mechanical transmission system 225.

For example, the main pipe and/or the brake pipe may be included in—or associated with—the pneumatic or electro-pneumatic braking system. In the case of a pneumatic or electro-pneumatic braking system, it may be controlled, for example, by a communication bus arranged along the at least one vehicle or along the convoy, in the case of a plurality of vehicles. By means of such bus, for example, it will be possible to provide the various braking controls to the one or more braking control means.

In a further embodiment, preferably, the braking means may belong to or be associated with a pneumatic or electromechanical braking system.

In this case, the at least one vehicle may include an electric line arranged to provide electric energy to the braking means associated with said at least one wheel, and the step a) may comprise the step of:

imposing in said electric line an electric energy value adapted to make said braking means produce the braking force Fa on the at least one wheel 100, 200 of said at least one axle of the at least one vehicle 301, 302, . . . , 303.

Preferably, the braking means may include, for example, an electromechanical assembly to which a shoe or a pad is coupled, and may be arranged to act on a wheel or on a disc, respectively. For example, the electromechanical assembly may comprise an electric motor. The electric motor may, for example, use electric energy to move a mechanical assembly, the movement of which may drive said shoe or pad.

As regards the movement of the at least one vehicle, preferably step b) may comprise:

towing the at least one vehicle 301, 302, . . . , 303, so that the at least one vehicle moves at the non-zero and constant forward speed.

The towing action may be carried out, for example, by means of a towing means 300. The towing means may be a locomotive, for example.

Preferably, the at least one vehicle 301, 302, . . . , 303 may include a plurality of axles. Furthermore, at least two wheels may be coupled to each axle. In this case, the previously explained steps c, d), e) may be performed for each wheel of each axle of the at least one vehicle.

Preferably, the vehicles may be at least two 301, 302, . . . , 303. Clearly, each vehicle 301, 302, . . . , 303 may include a plurality of axles and at least two wheels may be coupled to each axle. In this case, the previously explained steps c, d), e) may be performed for each wheel of each axle of each vehicle.

Therefore, summing up for all wheels, it will be possible to:

c) measure on the rail 101, 201, 502, the friction forces $F_b$ exerted by the wheels 100, 200, 503 at the respective contact points between the rail and the wheels;

d) compare the measured friction forces $F_b$ with a predetermined minimum friction force value $F_{bmin}$;

e) determine that the braking means associated with each wheel whose measured friction force $F_b$ is lower than said predetermined minimum friction force value $F_{bmin}$ are malfunctioning.

For example, the friction forces $F_b$ may be measured by the at least one force sensor means 208, 209 or at least one strain gauge sensor means 501.

In a second aspect thereof, the invention relates to a system for measuring the friction force generated by at least one wheel of at least one vehicle, in particular of at least one railway vehicle. Such at least one vehicle comprises at least one axle to which at least one wheel arranged to travel on a rail 101, 201, 502 is coupled, braking means associated with said at least one wheel and arranged to produce a braking force $F_a$ on the at least one wheel 100, 200. As may be observed for example in FIG. 1, a friction force $F_b$ is exerted by the at least one wheel 100, 200, 503, at a contact point 102, 202 between the rail and the at least one wheel, when said braking force $F_a$ is exerted on said at least one wheel. The value of the friction force $F_b$ generated by the at least one wheel is a function of the braking force $F_a$ applied to the at least one wheel.

Figure 2:
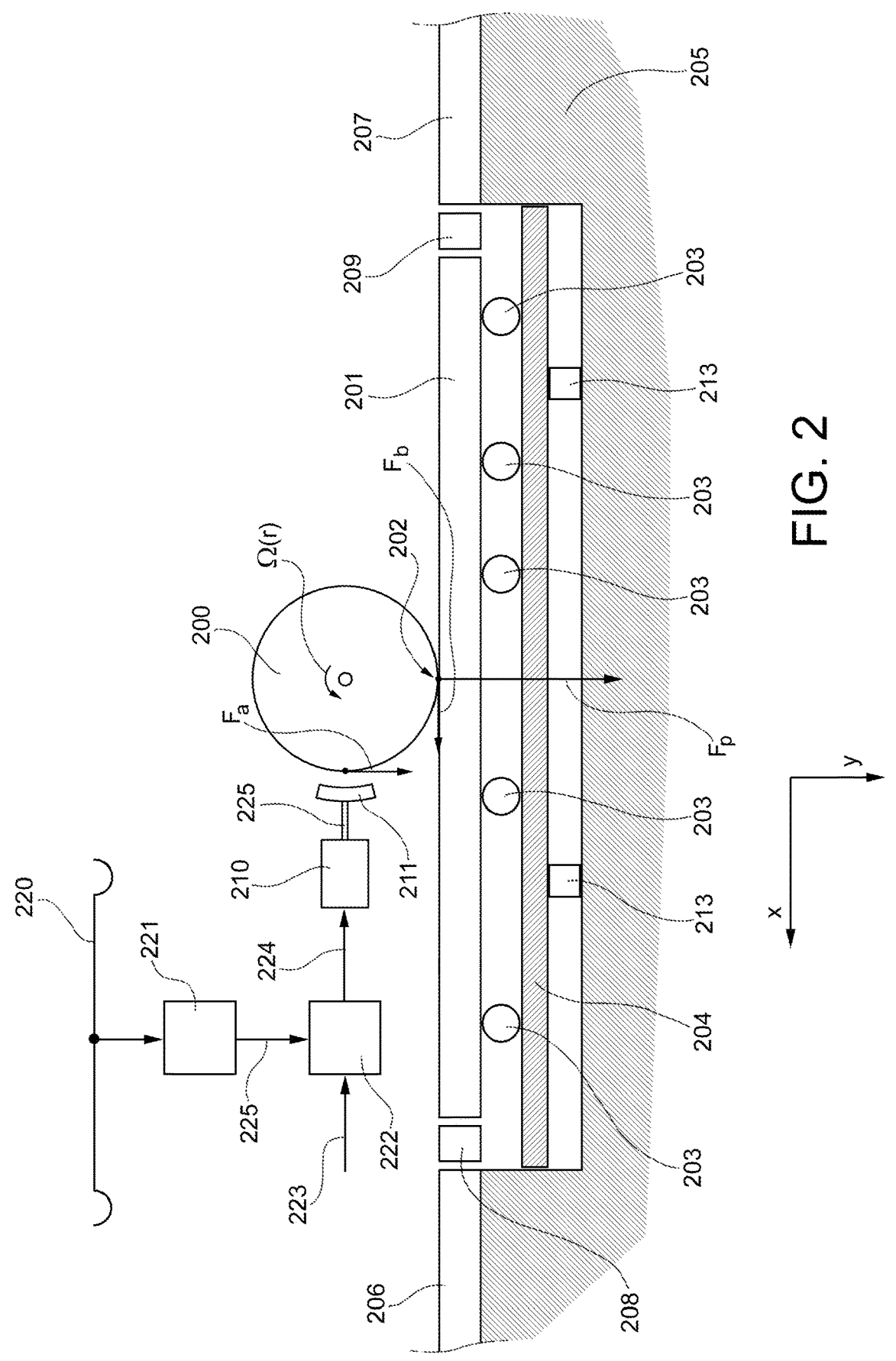
FIG. 2 illustrates an embodiment of a system for verifying the operation of braking means of at least one vehicle according to the invention.

With reference to FIG. 2, in a first embodiment, the system for measuring a friction force 304 comprises a movable rail segment 201 arranged to allow contact transit of said at least one wheel 200 in a measurement step. The contact transit of the at least one wheel 200 is arranged to transmit to the movable rail segment 201 the friction force $F_b$ which is a function of the braking force $F_a$. The movable rail segment 201 is arranged to slide, according to a transit direction of said at least one wheel 200, due to the friction force $F_b$ generated by said at least one wheel.

The system for measuring a friction force 304 comprises at least a first force sensor means 208, for example a force transducer, arranged alongside a first end of the movable rail segment 201. The first force sensor means 208 is arranged with respect to the movable rail segment 201 so that the movable rail segment 201 is arranged to push against the first force sensor means 208 when the movable rail segment 201 moves in the transit direction, i.e. travel, of the at least one wheel. The first force sensor means 208 is arranged to measure the force generated by the sliding of the movable rail segment 201 according to the transit direction of the at least one wheel. The force generated by the horizontal sliding of the movable rail segment 201 and measured by the first force sensor means 208 is substantially correspondent to the friction force $F_b$ generated by the at least one wheel.

Preferably, the system for measuring a friction force 304 may further comprise a second force sensor means 209, for example a force transducer, arranged alongside a second end of the movable rail segment 201, opposite to the first end. In this way, the system for measuring the friction force 304 may be able to measure the force generated by the sliding of the movable rail segment 201 according to both possible transit directions of the at least one wheel.

Preferably, the movable rail segment 201 may be arranged to slide on sliding means 203 arranged to be placed on a support 204. The support 204 may be arranged to be below the movable rail segment 201 and constrained to a ground 205.

Preferably, the support 204 may be arranged to transmit a vertex force gravitating on it to at least one weight force sensor means 213, for example but not exclusively a force transducer or a load cell.

In an alternative embodiment, the system for measuring a friction force generated by at least one wheel of at least one vehicle, in particular of at least one railway vehicle, comprises at least a first strain gauge sensor means 501 arranged to be constrained to one side of the rail 502. The first strain gauge sensor means 501 is arranged to be oriented so as to measure said friction force $F_b$ according to a first transit direction of the at least one wheel 200 or a second transit direction of the at least one wheel 200, opposite to the first transit direction.

Preferably, the system for measuring a friction force may further comprise a second strain gauge sensor means arranged to be constrained to one side of the rail 502, adjacent to said first strain gauge sensor means 501. The second strain gauge sensor means may therefore be arranged to be oriented so as to measure a weight force acting on the rail.

The first and second strain gauge sensor means may each be a strain gauge sensor or a strain gauge.

In other words, the first and second strain gauge means may functionally replace the first force sensor means and the second force sensor means 208, 209 and the at least one weight force sensor means 213, respectively.

Given the low cost of the latter solution, several strain gauge sensor means may be installed along the rail 502 along the measurement area in order to be able to perform the measurement simultaneously on several wheels and accelerate the measurement process.

With regard to the systems for measuring the friction force generated by at least one wheel of at least one vehicle described, the at least one vehicle may further include:

- a brake pipe 220 arranged to provide a braking pressure $P_f$ to the braking means associated with said at least one wheel, wherein the braking pressure $P_f$ is adapted to produce a braking force $F_a$ on the at least one wheel 100, 200; or
- an electric line arranged to provide electric energy to the braking means associated with said at least one wheel, wherein an electric energy value is adapted to make said braking means produce the braking force Fa on the at least one wheel 100, 200 of said at least one axle of the at least one vehicle 301, 302, . . . , 303; or
- at least one braking control means associated with said at least one wheel, arranged to control said means so as to impose the braking force Fa on the at least one wheel 100, 200 of said at least one axle of the at least one vehicle 301, 302, . . . , 303.

b) When the vehicle includes the at least one braking control means, the at least one vehicle may include a main pipe arranged to provide a predetermined braking pressure to the braking means associated with said at least one wheel. Wherein, by means of the braking control means, it is possible to adjust the value of the predetermined braking pressure received by said main pipe and to be provided to said braking means, so as to impose the braking force Fa on the at least one wheel 100, 200 of said at least one axle of the at least one vehicle 301, 302, . . . , 303.

In another aspect, the invention relates to a system for verifying the operation of braking means for at least one vehicle 301, 302, . . . , 303, in particular at least one railway vehicle. Again, the at least one vehicle includes at least one axle to which at least one wheel arranged to travel on a rail 101, 201, 502 is coupled, and braking means associated with said at least one wheel arranged to produce a braking force $F_a$ on the at least one wheel 100, 200. As already explained above, the friction force $F_b$ is exerted by the at least one wheel 100, 200, 503, at a contact point 102, 202 between said rail and said at least one wheel, when said braking force $F_a$ is exerted on said at least one wheel. The value of the friction force $F_b$ generated by the at least one wheel being a function of said braking force $F_a$ applied to the at least one wheel.

In a first embodiment, the system for verifying the operation of braking means includes a system for measuring a friction force according to any one of the embodiments described above.

Furthermore, the system for verifying the operation of braking means includes control means arranged to determine that the braking means associated with the at least one wheel whose measured friction force $F_b$ is lower than a predetermined associated minimum friction force value $F_{bmin}$ are malfunctioning.

Preferably, the control means may be or may comprise at least one of a microprocessor, a microcontroller, a processor, a controller, a PLC, an FPGA, or the like.

Preferably, the control means may be arranged to identify that the passage of a wheel 100, 200, 503 has occurred when they detect a positive peak friction force $F_b$ value.

Preferably, the control means may be arranged to identify that the passage of a wheel 100, 200, 503 has occurred when they detect a positive peak weight force value $F_p$.

Preferably, the control means may be arranged to identify that the passage of a wheel 100, 200, 503 has occurred by means of a wheel counting device 308 arranged to be installed in proximity to the point of contact between the at least one wheel and the rail wherein the measurement of the friction force $F_b$ takes place. The wheel counting device 308 will be able to continuously transmit the information detected by it to the control means by means of a wired or wireless communication means 314.

Preferably, the control means may be arranged to identify that the passage of a wheel 100, 200, 503 has occurred by means of a camera 310 arranged to be installed in proximity to the contact point between the at least one wheel and the rail where the measurement of the friction force $F_b$ takes place, and at least one image recognition algorithm.

Preferably, the control means may be arranged to assign a unique position identifier along the at least one vehicle to each identified wheel 100, 200, 503.

Preferably, the control means may be arranged to:

receive each measured friction force $F_b$ corresponding to each wheel 100, 200, 503 of one or more vehicles;

compare each measured friction force $F_b$ with at least one predetermined minimum friction force value $F_{bmin}$; and determine that the braking means associated with each wheel whose associated measured friction force $F_b$ is lower than said at least one predetermined minimum friction force value $F_{bmin}$ are malfunctioning.

Preferably, the control means may be arranged to compare each friction force $F_b$ measured, associated with each wheel 100, 200, 503, with a respective predetermined minimum friction force value $F_{bmin}$ associated with each wheel via said unique position identifier along the one or more vehicles.

Preferably, the control means may be arranged to compare each friction force $F_b$ associated to each wheel 100, 200, 503 with a predetermined minimum friction force value $F_{bmin}$ associated to each wheel 100, 200, 503. As may be seen in FIG. 3, each minimum friction force value $F_{bmin}$ associated with each wheel may be arranged to be stored in an array addressed by the unique position identifier along one or more vehicles. The array may be included in a database 312 associated with said control means.

Alternatively, or in addition, the control means may be arranged to:

identify to which vehicle each wheel 100, 200, 503 is associated, by means of a camera 310 arranged to be installed in proximity to the contact point between each wheel and the rail where the measurement of the friction force $F_b$ takes place, and at least one image recognition algorithm;

compare each friction force $F_b$ associated to each wheel 100, 200, 503 with a respective predetermined minimum friction force value $F_{bmin}$ associated to each vehicle 301, 302, . . . , 303.

Each minimum friction force value $F_{bmin}$ associated with each vehicle 301, 302, . . . , 303 may be arranged to be stored in a first array addressed by the unique position identifier along the one or more vehicles. Again, the array may be arranged to be included in a database 312 associated with said control means.

In this case, preferably, the control means may be arranged to:

obtain weighted braking parameters associated with the one or more vehicles 301, 302, . . . , 303, wherein said weighted braking parameters associated with the one or more vehicles 301, 302, . . . , 303 are arranged to be stored in a second array addressed by the unique position identifier along the one or more vehicles;

obtain normalized braking force $F_a$ values associated with each wheel 100, 200, 503 through said weighted braking parameters.

Figure 3:
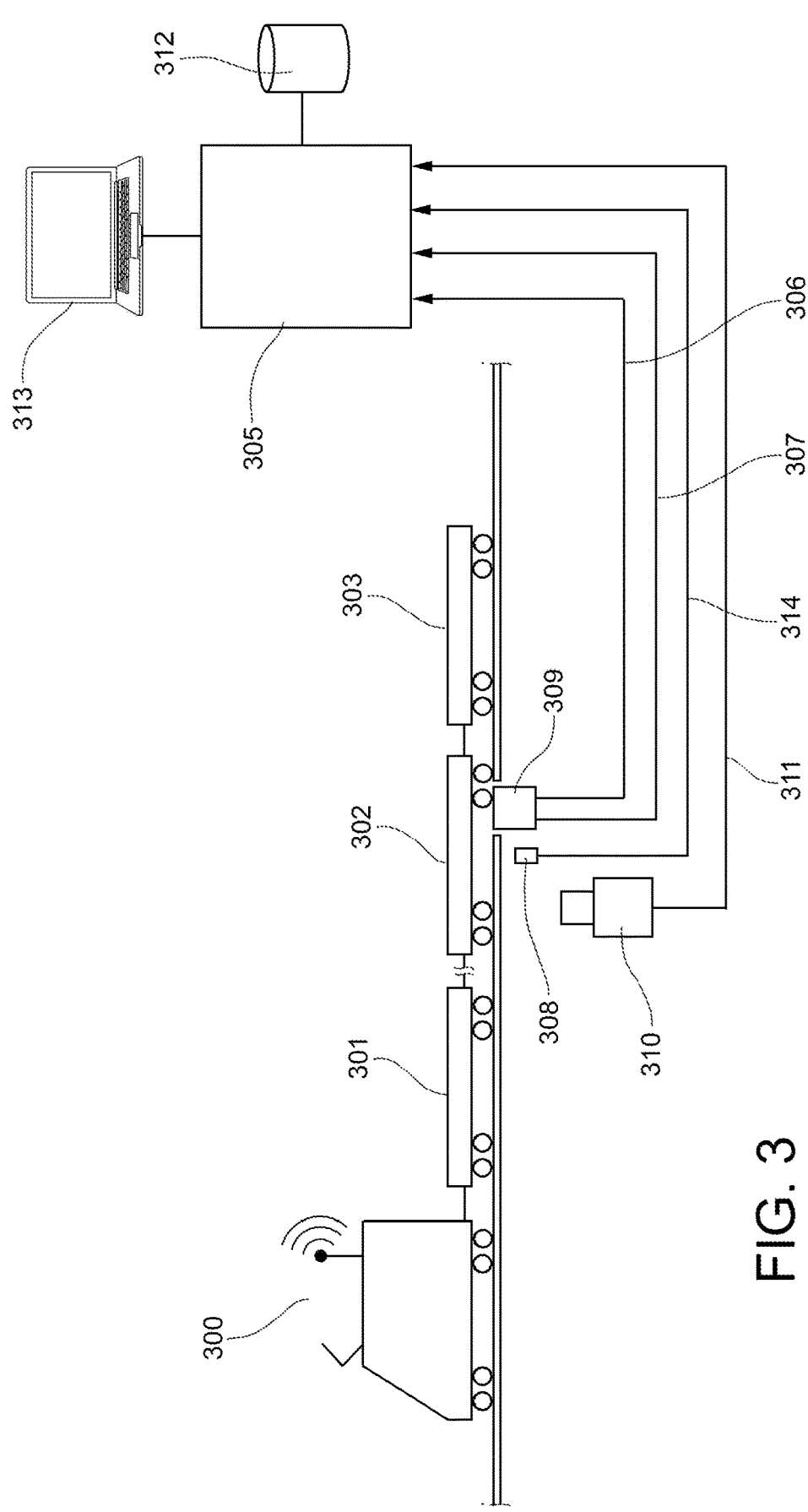
FIG. 3 illustrates a further embodiment of a system for verifying the operation of braking means of at least one vehicle according to the invention.

Preferably, as may be seen again in FIG. 3, the control means may be included in a measurement management system 305 comprising a computer system and arranged to receive each value of the friction force $F_b$ measured by the system for measuring a friction force.

With regard to a system for verifying the operation of braking means for at least one vehicle described, the at least one vehicle may further include:

a brake pipe 220 arranged to provide a braking pressure $P_f$ to the braking means associated with said at least one wheel, wherein the braking pressure $P_f$ is adapted to produce a braking force $F_a$ on the at least one wheel 100, 200; or an electric line arranged to provide electric energy to the braking means associated with said at least one wheel, wherein an electric energy value is adapted to make said braking means produce the braking force Fa on the at least one wheel 100, 200 of said at least one axle of the at least one vehicle 301, 302, . . . , 303; or at least one braking control means associated with said braking means, arranged to actuate said braking means so as to impose the braking force Fa on the at least one wheel 100, 200 of said at least one axle of the at least one vehicle 301, 302, . . . , 303.

When the vehicle includes the at least one braking control means, the at least one vehicle may include a main pipe arranged to provide a predetermined braking pressure to the braking means associated with said at least one wheel. Wherein, by means of the braking control means, it is possible to adjust the value of the predetermined braking pressure received by said main pipe and to be provided to said braking means, so as to impose the braking force Fa on the at least one wheel 100, 200 of said at least one axle of the at least one vehicle 301, 302, . . . , 303.

Hereinafter, to further clarify the operation of the present invention, various implementation examples and examples of use of the present invention will be illustrated.

With reference to FIG. 2, a first embodiment of a system for verifying the operation of braking means of at least one vehicle is explained in detail. The wheel 200 belongs to a vehicle, in particular a railway vehicle, not shown in the figure, and rests on the movable rail segment 201 at the contact point 202. The movable rail segment 201 is free to move along the axle X on sliding or rolling means 203 resting on a support 204. In the example illustrated, the support 204 is considered integral with the mechanical ground reference 205. In the present example, the support 204 may also translate vertically along the axis Y and weigh on at least one force sensor 213.

As may be observed in FIG. 2, the horizontal movement of the movable rail segment 201 is limited in the two directions along the axle X by two rails 206, 207 integral with the mechanical ground reference 205.

Two force sensor means, e.g. the first and second force sensor means 208, 209, for example but not exclusively two load cells, measure the force exerted by the movable rail segment 201 in its possible horizontal movement along the axle X, respectively on the rail 206, on the left in the figure, and on the rail 207, on the right in the figure.

During the vehicle braking step, braking means including a braking cylinder 110 and the shoe 111 exerts a braking force $F_a$ on the wheel 100 at the equivalent point 112.

Depending on the direction of the wheel 200, in the case of ω(t)=0 one between the first and the second force transducer 208, 209, will measure the friction force $F_B$ corresponding to the braking force $F_a$, i.e. braking exerted by the shoe 211 on the wheel 200 at the equivalent point 112.

Generally, a braking system for freight transport convoys, according to the prior art, is made by a brake pipe 220 whose pressure is controlled by a locomotive towed by one or more vehicles.

The brake pipe 220 supplies a device 221 known as a "distributor" valve and an auxiliary tank, not shown in the figure. The "distributor" valve 221 generates a braking pressure 225 as a function of the pressure present in the brake pipe 220, following a transfer function known to those skilled in the art.

A pneumatic weighing device 223 receives the braking pressure generated by the "distributor" valve 221 and a weight information 223. The weight information 223 being for example, but not exclusively, a pressure indicative of the weight of the carriage or vehicle to which the wheel 200 belongs. The weight information 223 further being, for example but not exclusively, the position of a manually operated indicator which indicates the weight of the carriage or vehicle to which the wheel 200 belongs.

A pneumatic weighing device 222 generates a weighted braking pressure 224 as a function of the braking pressure 225 and the weight information 223.

The braking force $F_a$ is a function of the weighted braking pressure 224, the dimensions of the braking cylinder 210, the mechanical transmission system 225, the friction coefficient between the shoe 211 and the wheel 200.

Knowing the pressure in the brake pipe 120, the measurement of the friction force $F_b$ by one of the force sensor means 208, 209, is therefore indicative of the state of the braking chain consisting of the "distributor" valve 221, the pneumatic weighing device 222, the mechanical transmission system 225, the shoe 211, the friction coefficient between the shoe 211 and the wheel 200.

If the support 204 is free to slide vertically along the Cartesian axis Y, and rests on the at least one weight force sensor means 213, for example, but not exclusively load cells, a weight force transducer reads the weight force $F_p$ exerted by the wheel 200 on the movable rail segment 201.

Knowing the weight force $F_p$, it is possible to deduce the weight information 223 in input to the pneumatic weighing device 222.

Figure 4:
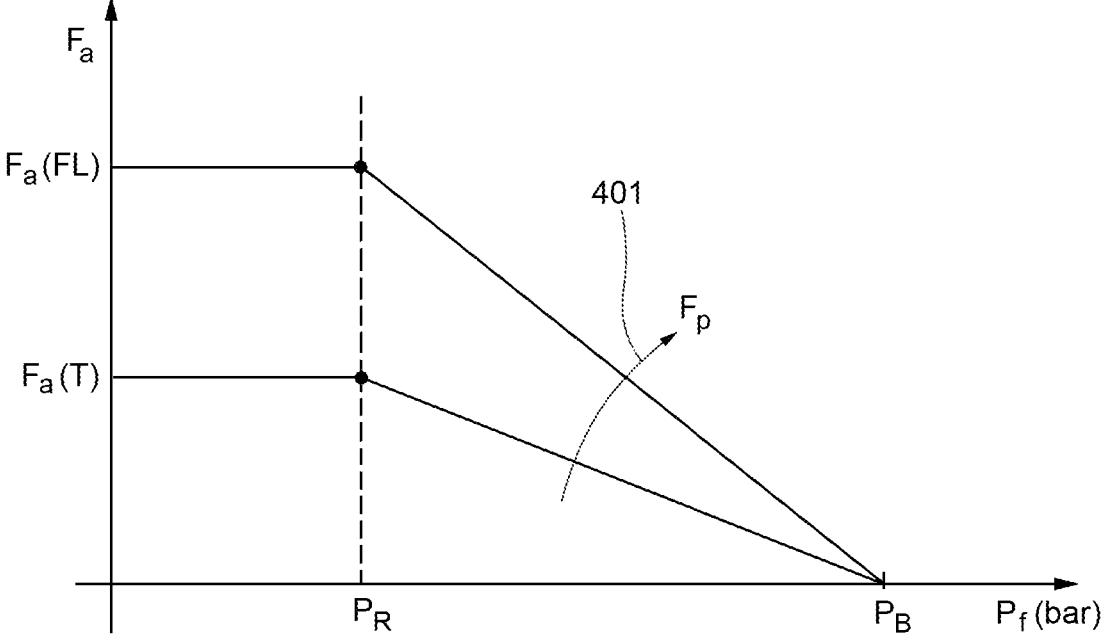
FIG. 4 shows above an exemplary relationship between the braking pressure of a brake pipe and a braking force, and below an exemplary relationship between a tare value and a full load value and the braking force.
Figure 4:
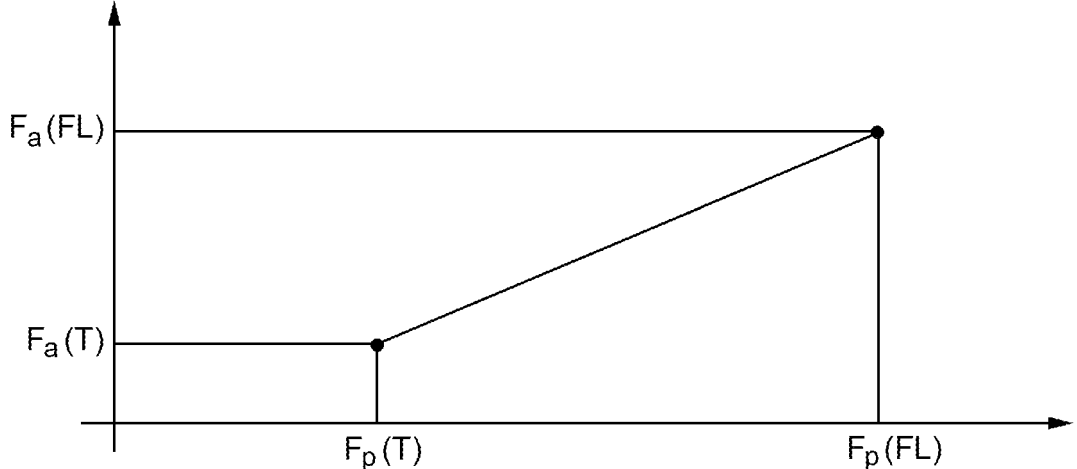
Figure 5:
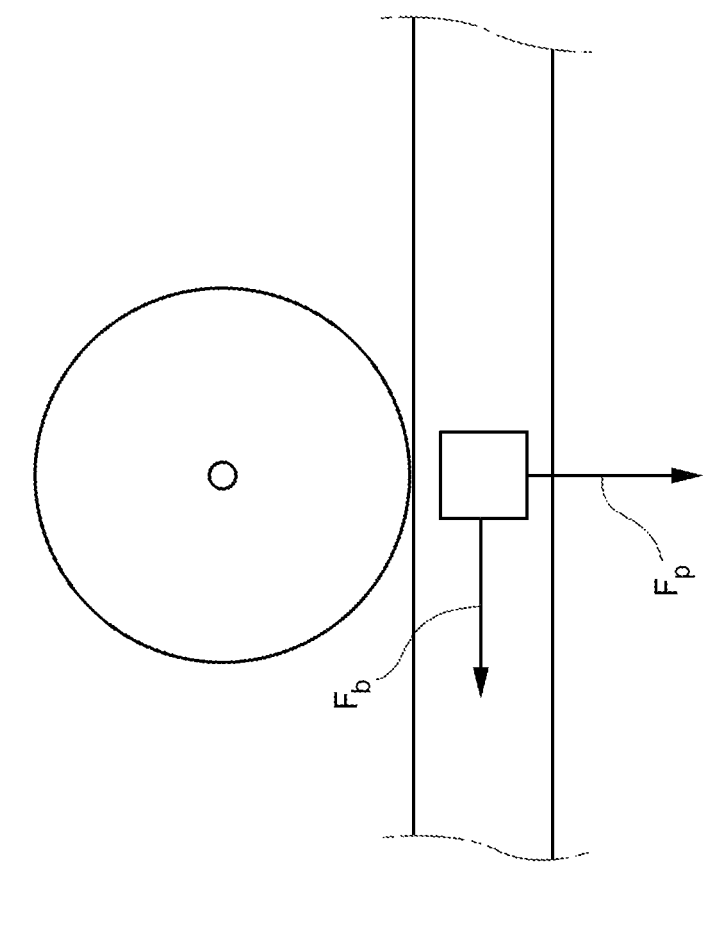
FIG. 5 illustrates an embodiment of a system for measuring the friction force generated by at least one wheel of at least one vehicle.
Figure 5:
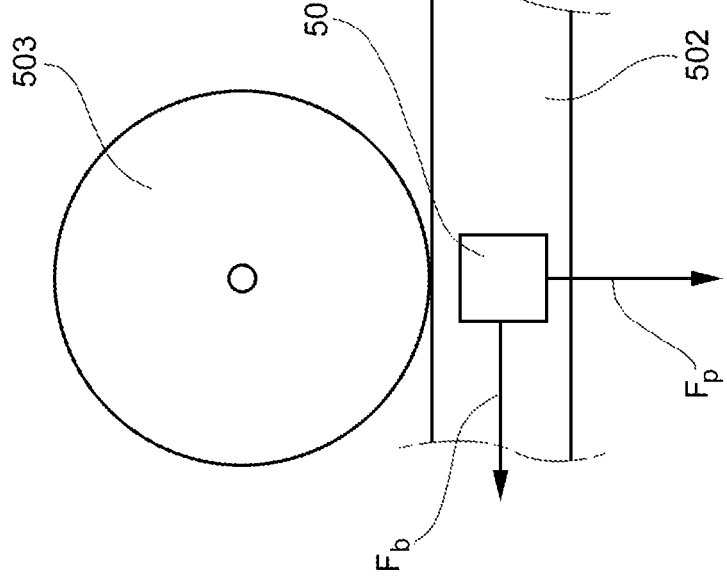

FIG. 4*a* illustrates a relationship, known to those skilled in the art, between the braking pressure of the brake pipe $P_f$ and the braking force $F_a$=friction force $F_b$, as the weight force increases in the direction of the arrow 401, where Pb=5 bar nominal and Pr=3.5 bar nominal, where the tare braking force value $F_a(T)$ and the full load braking force $F_a(FL)$ are specific values for a specific vehicle model.

FIG. 4*b* illustrates a possible relationship, known to those skilled in the art, as the weight force varies between the tare value $F_p(T)$ and the full load value $F_p(FL)$ and the braking force $F_a$=friction force $F_b$ for a constant value of braking pressure of the brake pipe, for example $P_f$=3.5 bar, for a specific vehicle model.

The parameters $F_a(T)$, $F_a(FL)$, $F_p(T)$, $F_p(FL)$ will be defined below as "vehicle weighing braking parameters".

Knowing the braking pressure $P_f$ in the brake pipe 220, the weight force $F_p$, the measure of the friction force $F_b$=braking force $F_a$, it is therefore possible to have a better accuracy in evaluating the state of the braking means (also said braking chain) comprising the "distributor" valve 220, the pneumatic weighing device 222, a mechanical transmission system 225, the shoe 211, the friction coefficient between the shoe 211 and the wheel 200.

A first implementation example of a method for verifying the operation of braking means for at least one vehicle is also described below.

Referring to FIG. 3, a locomotive 300 may tow a convoy, in particular a railway convoy, made by at least one vehicle 301, 302, . . . , 303, at a constant speed in order to keep the angular acceleration of each wheel of the train at zero, or $$\frac{d\omega}{dt} = 0,$$

transiting on a system for measuring a friction force. In the present example, in addition to the locomotive, three other vehicles 301, 302, 303 are illustrated, each having four axles, for a total of 8 wheels per vehicle.

Furthermore, the locomotive 300 may control a known constant pressure $P_f$, such as to urge the braking means of the at least one vehicle 301, 302, . . . , 303 to apply a braking force $F_a$, and at the same time such as to allow said locomotive 300 to continue towing the convoy at constant speed.

Otherwise, the locomotive 300 may control a constant braking pressure $P_f$ such as to guarantee the measurement conditions described in the previous paragraph, the value of which depends further on local instantaneous operating conditions, and transmits said pressure value $P_f$ via a wireless channel to a measurement management system 305, the function of which will be detailed later.

A system for measuring a friction force 304 will be able to measure the friction force $F_b$ exerted by each wheel on the movable rail segment 201 forming part of the system for measuring a friction force 304.

The system for measuring a friction force 304 will be able to continuously transmit the measured friction value $F_b$ of each wheel of the at least one vehicle 301, 302, . . . , 303 to a measurement management system 305 via a wired or wireless communication means 306.

If the support 204 is free to slide vertically along the Cartesian axis Y, the at least one weight force sensor means 213 reads the weight force $F_p$ exerted by the wheel 200 on the movable rail segment 201 and continuously transmits the weight force value $F_p$ measured, corresponding to each wheel of the at least one vehicle 301, 302, . . . , 303, to the computer measurement management system 305 by means of the wired or wireless communication means 307.

Such measurement management system 305 will be able to identify the passage of a wheel according to at least one of the following methods:

identifying a change in force along the axle X, from zero to non-zero value and back to zero, measured by at least one of the first and second force sensor means 208, 209;

identifying a weight force change Fp along axis Y, from zero to non-zero value and back to zero, measured by the at least one weight force sensor means 313;

by means of a wheel counting device 308 connected to said measurement management system 305 by means of a wired or wireless communication means 309;

by means of a camera 310 which sends the image of the at least one vehicle 301, 302 . . . 303 transiting on the measurement system 304 by means of a wired or wireless communication means 311 to the measurement management system 305; the measurement management system 305 identifies the passage of a wheel transiting on the measurement system 304 by means of image analysis algorithms, analyzing the image sent by the camera 310.

As each wheel passes, the measurement management system 305 may associate a unique identifier consisting of an incremental numerical value to each wheel and saves it in a database 312, e.g. database, together with the corresponding measured friction force value $F_b$ and possibly with the corresponding measured weight force value $F_p$.

The database 312 may contain the configuration of the convoy, that is the position of each vehicle inside the convoy and the number of axles of each vehicle. In this way, the centralized measurement management system 305 will be able to associate each braking force measurement $F_b$ to each wheel of each vehicle 301, 302, . . . , 303.

During a first example of a brake test of a convoy, in particular a railway convoy, comprising at least one vehicle 301, 3012 . . . 303, towed by a locomotive 300 at constant speed, when said locomotive 300 applies a braking pressure $P_f$ in the brake pipe 220, the following steps may be carried out:

acquiring each friction force value $F_b$ sent by the system for measuring a friction force 204 and associating it with each wheel identified by at least one of the previously described identification methods;

comparing the friction force values $F_b$ acquired with a predetermined minimum friction force value $F_{bmin}$ associated with the convoy being measured and with the pressure value in the brake pipe 220;

in the presence of a friction force value $F_b$ lower than said predetermined minimum friction force value $F_{bmin}$, identifying the vehicle associated with the wheel to which the current friction force value $F_b$ belongs and reporting the identified vehicle to an operator, for example, but not exclusively, by means of a human-machine interface 313.

Otherwise, during a second example of a brake test of a convoy, in particular a railway convoy, comprising at least one vehicle 301, 302 . . . 303, towed by the locomotive 300 at constant speed, when said locomotive 300 applies a braking pressure $P_f$ in the brake pipe 220, the following steps may be carried out:

acquiring each friction force value $F_b$ sent by the system for measuring a friction force 204 and associating it with each wheel identified by at least one of the previously described identification methods;

comparing the friction force values $F_b$ acquired with the values contained in a vector of predetermined minimum friction force values $F_{bmin\_1}$, $F_{bmin\_2}$, . . . , $F_{bmin\_3}$, wherein each is associated with one of said vehicles 301, 302, . . . , 303 included in the convoy to an extent in which each of said minimum friction force values $F_{bmin\_1}$, $F_{bmin\_2}$, . . . , $F_{bmin\_3}$ is associated with a predetermined braking pressure value $P_f$ of the brake pipe 220, said vector of predetermined values being contained in the database 312.

in the presence of a friction force value $F_b$ lower than said predetermined corresponding value of $F_{bmin\_n}$, identifying the vehicle associated with the wheel to which the current friction force value $F_b$ belongs and reporting the identified vehicle to an operator, for example, but not exclusively, by means of a human-machine interface 313.

Still otherwise, during a third example of a brake test of a convoy, in particular a railway convoy, comprising at least one vehicle 301, 302 . . . 303, towed by a locomotive 300 at constant speed, when said locomotive 300 applies a predetermined braking pressure $P_f$ in the brake pipe 220, the following steps may be carried out:

acquiring each friction force value $F_b$ and weight force value $F_p$ sent by the system for measuring the friction force 204, and associating each friction force value $F_b$ and weight force value $F_p$ with each wheel identified with at least one of the identification methods described above;

normalizing each acquired force value $F_b$ as a function of the associated force-weight value $F_p$ acquired, of the braking pressure value $P_f$ in the brake pipe, and of the weighted braking parameters associated with the vehicle in question; wherein the weighted braking parameters are contained in the database 312;

comparing each normalized friction force value $F_b$ with the comparison normalized values contained in a vector of predetermined minimum friction force values $F_{bmin\_1}$, $F_{bmin\_2}$, . . . , $F_{bmin\_3}$, in each of these minimum friction force values $F_{bmin\_1}$, $F_{bmin\_2}$, . . . , $F_{bmin\_3}$ is associated with one of said vehicles 301, 302, . . . , 303 belonging to the convoy being measured;

in the presence of a friction force value $F_b$ lower than said predetermined corresponding minimum friction force value $F_{bmin\_n}$, identifying the vehicle associated with the wheel to which the current friction force value $F_b$ belongs and reporting the vehicle to an operator, for example, but not exclusively, by means of a human-machine interface 313.

A further implementation example of a method for verifying the operation of braking means of at least one vehicle, in particular at least one railway vehicle, is described below:

Embodiment Example

Method for verifying the operation of braking means of at least one railway vehicle 301, 302, . . . , 303, wherein said at least one railway vehicle includes:

at least one axle to which at least one wheel is coupled;

a brake pipe 220 arranged to provide a braking pressure $P_f$ to the braking means associated with said at least one wheel, said method for verifying the operation of braking means comprising the steps of:

a) imposing in said brake pipe 220 a braking pressure $P_f$ adapted to produce a braking force $F_a$ on the at least one wheel 100, 200 of said at least one axle of the at least one railway vehicle 301, 302, . . . , 303;

b) towing said at least one railway vehicle 301, 302, . . . , 303, so that said at least one railway vehicle moves at a non-zero and constant forward speed;

c) measuring on the rail 101, 201, 502 at least one friction force $F_b$ which is a function of said braking force $F_a$, the at least one friction force $F_b$ being exerted by said at least one wheel 100, 200, 503 at a contact point 102, 202 between said rail and said at least one wheel;

d) comparing the at least one measured friction force $F_b$ with a predetermined minimum friction force value $F_{bmin}$;

e) determining that the braking means associated with the at least one wheel whose measured friction force $F_b$ is lower than said predetermined minimum friction force value $F_{bmin}$ are malfunctioning.

The advantage achieved is therefore that of having provided an effective solution but without implying high costs both as regards the hardware components and as regards the installation and upgrade costs of the complete fleet.

The at least one vehicle to which the present invention is applicable, in addition to the railway field, may be applied analogously to any vehicle traveling on rails.

a) A further advantage achieved is that of having provided a solution which does not involve expensive development and certification costs in accordance with the safety standards in force (EN50126, EN50128, EN50129).

Several aspects and embodiments of a method for verifying the operation of braking means of at least one vehicle, of a system for measuring the friction force generated by at least one wheel of at least one vehicle and of a system for verifying the operation of braking means of at least one vehicle according to the invention have been described. It is understood that each embodiment may be combined with any other embodiment. Furthermore, the invention is not limited to the described embodiments, but may be varied within the scope defined by the appended claims.

The invention claimed is:

1. A method for verifying the operation of braking means of at least one vehicle, wherein said at least one vehicle includes:

at least one axle to which at least one wheel arranged to travel on a rail is coupled;

braking means associated with said at least one wheel; said method for verifying the operation of braking means comprising the steps of:

a) imposing, by means of said braking means, a braking force on the at least one wheel of said at least one axle of the at least one vehicle;

b) moving said at least one vehicle, so that said at least one vehicle moves at a non-zero and constant forward speed;

c) measuring on the rail at least one friction force which is a function of said braking force, the at least one friction force being exerted by said at least one wheel at a contact point between said rail and said at least one wheel, wherein the measuring is by a first force sensor means arranged at the side of a first end of a moveable rail segment arranged to allow contact transit of said at least one wheel;

d) comparing the at least one measured friction force with a predetermined minimum friction force value;

e) determining that the braking means associated with the at least one wheel whose measured friction force is lower than said predetermined minimum friction force value are malfunctioning.

2. The method for verifying the operation of braking means according to claim 1, wherein said at least one vehicle includes a brake pipe arranged to provide a braking pressure to the braking means associated with said at least one wheel; wherein said step a) comprises:

imposing in said brake pipe a braking pressure adapted to make said braking means produce the braking force on the at least one wheel of said at least one axle of the at least one vehicle.

3. The method for verifying the operation of braking means according to claim 1, wherein said at least one vehicle includes an electric line arranged to provide electric energy to the braking means associated with said at least one wheel; wherein said step a) comprises:

imposing in said electric line an electric energy value adapted to make said braking means produce the braking force on the at least one wheel of said at least one axle of the at least one vehicle.

4. The method for verifying the operation of braking means according to claim 1, wherein said at least one vehicle includes a braking control means associated with said braking means;

wherein said step a) comprises:

a') by means of said braking control means, actuating said braking means so as to impose the braking force on the at least one wheel of said at least one axle of the at least one vehicle.

5. The method according to claim 4, wherein said at least one vehicle includes a main pipe arranged to provide a predetermined braking pressure to the braking means associated with said at least one wheel, wherein step a') comprises:

by means of the braking control means, adjusting the value of the predetermined braking pressure received by said main pipe and to be provided to said braking means for actuating said braking means, so as to impose the braking force on the at least one wheel of said at least one axle of the at least one vehicle.

6. The method for verifying the operation of braking means according to claim 1, wherein step b) comprises:

towing said at least one vehicle, so that said at least one vehicle moves at the non-zero and constant forward speed.

7. The method for verifying the operation of braking means according to claim 1, wherein the at least one vehicle includes a plurality of axles, wherein at each axle is coupled to least two wheels;

wherein steps c, d), e) are performed for each wheel of each axle of the at least one vehicle.

8. The method for verifying the operation of braking means according to claim 1, wherein the vehicles are at least two;

wherein steps c, d), e) are performed for each wheel of each axle of each vehicle.

9. A system for measuring a friction force generated by at least one wheel of at least one vehicle, in particular at least one railway vehicle, wherein said at least one vehicle comprises:

at least one axle to which at least one wheel arranged to travel on a rail is coupled;

braking means associated with said at least one wheel and arranged to produce a braking force on the at least one wheel;

wherein a friction force is exerted by the at least one wheel, at a contact point between said rail and said at least one wheel, when said braking force is exerted on said at least one wheel;

the value of the friction force generated by the at least one wheel being a function of said braking force applied to the at least one wheel;

said system for measuring a friction force comprising a movable rail segment arranged to allow contact transit of said at least one wheel in a measurement step, the contact transit of said at least one wheel being arranged to transmit to said movable rail segment said friction force, which is a function of said braking force; said movable rail segment being arranged to slide, according to a transit direction of said at least one wheel, due to the friction force generated by said at least one wheel;

said system for measuring a friction force comprising at least a first force sensor means arranged at the side of a first end of said movable rail segment; said first force sensor means being arranged with respect to the movable rail segment so that the movable rail segment is arranged to push against said first force sensor means when said movable rail segment moves in the transit direction of said at least one wheel;

said first force sensor means being arranged to measure the force generated by the sliding of said movable rail segment according to the transit direction of said at least one wheel;

the force generated by the horizontal sliding of said movable rail segment and measured by the first force sensor means being correspondent to the friction force generated by the at least one wheel.

10. The system for measuring a friction force according to claim 9, wherein the system for measuring the friction force further comprises a second force sensor means arranged at the side of a second end of said movable rail segment, opposite to said first end;

so that the system for measuring the friction force is able to measure the force generated by the sliding of said movable rail segment according to both possible transit directions of said at least one wheel.

11. The system for measuring a friction force according to claim 9, wherein said movable rail segment is arranged to slide on sliding means arranged to be placed on a support;

said support being arranged to be below said movable rail segment and constrained to a ground.

12. The system for measuring a friction force according to claim 11, wherein the support is arranged to transmit a vertex force gravitating on it to a weight force sensor means.

13. A system for verifying the operation of braking means of at least one vehicle, in particular at least one railway vehicle, wherein the at least one vehicle includes:

at least one axle to which at least one wheel arranged to travel on a rail is coupled;

braking means associated with said at least one wheel and arranged to produce a braking force on the at least one wheel;

wherein a friction force is exerted by the at least one wheel, at a contact point between said rail and said at least one wheel, when said braking force is exerted on said at least one wheel;

the value of the friction force generated by the at least one wheel being a function of said braking force applied to the at least one wheel;

the system for verifying the operation of braking means including:

a system for measuring a friction force according to claim 9; and control means arranged to determine that the braking means associated with the at least one wheel whose measured friction force is lower than a predetermined minimum friction force value are malfunctioning.

14. The system for verifying the operation of braking means according to claim 13, wherein said control means are arranged to identify that a passage of a wheel has occurred when they detect a positive peak friction force value.

15. The system for verifying the operation of braking means according to claim 14, wherein said control means are arranged to identify that the passage of a wheel has occurred by means of a wheel counting device arranged to be installed in proximity to the point of contact between the at least one wheel and the rail wherein the measurement of the friction force takes place.

16. The system for verifying the operation of braking means according to claim 14, wherein said control means are arranged to identify that the passage of a wheel has occurred by means of:

a camera arranged to be installed in proximity to the point of contact between the at least one wheel and the rail where the measurement of the friction force takes place; and at least one image recognition algorithm.

17. The system for verifying the operation of braking means according to claim 13, wherein said control means are arranged to identify that a passage of a wheel has occurred when they detect a positive peak weight force value.

18. The system for verifying the operation of braking means according to claim 13, wherein said control means are arranged to assign a unique position identifier along the at least one vehicle to each identified wheel.

19. The system for verifying the operation of braking means according to claim 18, wherein said control means are arranged to:

receive each measured friction force of each wheel of one or more vehicles;

compare each measured friction force with at least one predetermined minimum friction force value; and determine that the braking means associated with each wheel whose associated measured friction force is lower than said at least one predetermined minimum friction force value are malfunctioning.

20. The system for verifying the operation of braking means according to claim 19, wherein said control means are arranged to compare each friction force associated with each wheel with a respective predetermined minimum friction force value associated with each wheel via said unique position identifier along the one or more vehicles.

* * * * *